United States Patent
Won et al.

(10) Patent No.: US 9,812,891 B2
(45) Date of Patent: Nov. 7, 2017

(54) METHOD FOR TRANSFERRING WIRELESS POWER

(71) Applicant: Korea Electronics Technology Institute, Seongnam-si (KR)

(72) Inventors: Yun Jae Won, Yongin-si (KR); Seung Ok Lim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 15/156,909

(22) Filed: May 17, 2016

(65) Prior Publication Data
US 2016/0261140 A1 Sep. 8, 2016

Related U.S. Application Data

(62) Division of application No. 14/255,641, filed on Apr. 17, 2014, now Pat. No. 9,543,779.

(60) Provisional application No. 61/812,879, filed on Apr. 17, 2013.

(51) Int. Cl.
*H02J 7/00* (2006.01)
*H02J 7/02* (2016.01)
*H02J 7/04* (2006.01)

(52) U.S. Cl.
CPC .............. *H02J 7/025* (2013.01); *H02J 7/045* (2013.01)

(58) Field of Classification Search
CPC .......... H02J 5/005; H02J 7/025; H02J 7/0042; H02J 17/00; H02J 7/0013; H02J 7/0052; H02J 50/80; H02J 7/0027; H02J 2007/005; H02J 50/00; H02J 50/20; H02J 7/0044; H02J 7/045; H02J 5/00; H02J 50/12
USPC .................................................. 320/106–115
See application file for complete search history.

(56) References Cited

U.S. PATENT DOCUMENTS

| | | | |
|---|---|---|---|
| 7,741,734 B2 | 6/2010 | Joannopoulos et al. | |
| 2013/0249479 A1* | 9/2013 | Partovi | H02J 7/025 320/108 |
| 2013/0285604 A1* | 10/2013 | Partovi | H02J 7/0042 320/108 |
| 2013/0300204 A1* | 11/2013 | Partovi | H01F 38/14 307/104 |

\* cited by examiner

*Primary Examiner* — Binh Tat

(57) ABSTRACT

This invention defines management protocols for wireless power transfer to multiple devices in Multi-device Wireless Power Management System. Various functions of Multi-device Wireless Power Management System are justified from this invention. The WPT frames and messages which work between the management block of a charger and the management block or the coupler block of a device, or the coupler block of a charger are defined as well to execute various functions. Also the procedures for each functionality are described based on its frames and messages.

6 Claims, 35 Drawing Sheets

Home

Vehicle

Office

FIG. 11

Unit: Byte

| 1 | 2 | 2 | 2 | 1 | Variable | 2 |
|---|---|---|---|---|----------|---|
| MFAN ID | Frame control | Source node ID | Destination node ID | Sequence number | Payload | Frame check sequence |
| Frame header | | | | | Frame body | |

FIG. 12

Unit: Byte

| 8 | 8 | 1 | L | 2 |
|---|---|---|---|---|
| Frame header | UID | Command code | Command block | Frame check sequence |
| | Frame body | | | |

FIG. 13

| 1 | 1 | 1 | L1 | L2 | ... | Ln |
|---|---|---|----|----|-----|-----|
| Group ID | Request code | Length (= $\sum L_n$) | Request block-1 | Request block-2 | ... | Request block-n |

Unit: Byte

FIG. 14

| | | | Unit: Byte |
|---|---|---|---|
| 2 | 1 | 1 | |
| Node ID | Slot number | Signal strength sent at coordinator | |

FIG. 15

|   |   |   | 2 | |
|---|---|---|---|---|
| 1 | 1 | 2 | 1 | 1 |
| WPT ID | Slot number | Time Length(ms) | Power Transfer Level (W) | |
|   |   |   | Significant figure | n |

Unit: Byte

FIG. 16

| | | | | | | Unit: Byte |
|---|---|---|---|---|---|---|
| 1 | 1 | 1 | L1 | L2 | ... | Ln |
| Group ID | Response code | Length(=L) | Response block-1 | Response block-2 | ... | Response block-n |

FIG. 17

Unit: Byte

| 2 | 2 | 2 | 2 |
|---|---|---|---|
| The remaining amount of power in battery | Required power level by node | Signal level received at node | Signal level sent at coordinator |

FIG. 18

Unit: Byte

| 1 | 1 | 1 | L1 | L2 | ... | Ln |
|---|---|---|---|---|---|---|
| Group ID | Response confirmation code | Length (=L) | Response confirmation block-1 | Response confirmation block-2 | ... | Response confirmation block-n |

FIG. 19

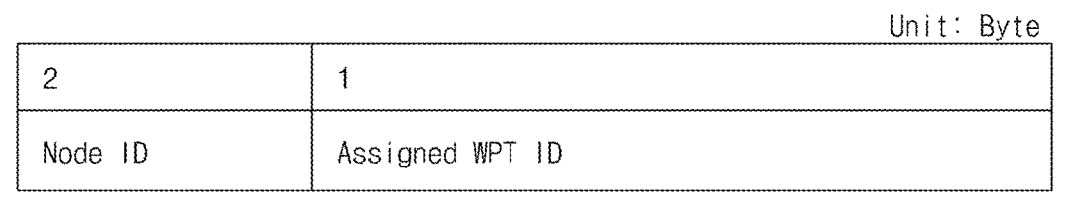

Unit: Byte

| 2 | 1 |
|---|---|
| Node ID | Assigned WPT ID |

FIG. 20

| | | Unit: Byte |
|---|---|---|
| 2 | 1 | 1 |
| Node ID | Policy | Assigned WPT ID |

FIG. 21

| | Unit: Byte |
|---|---|
| 2 | 1 |
| Node ID | Received power strength |

FIG. 22

Unit: Byte

| 1 | 1 |
|---|---|
| WPT ID | Current Power Level |

FIG. 23

| | | Unit: Byte |
|---|---|---|
| 8 | 1 | L |
| UID | Command code | Command block |

FIG. 24

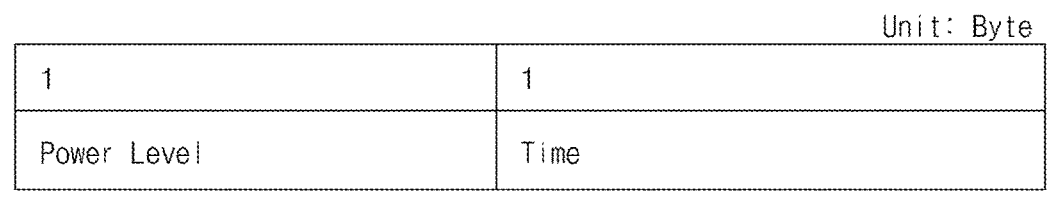

Unit: Byte

| 1 | 1 |
|---|---|
| Power Level | Time |

FIG. 25

| | Unit: Byte |
|---|---|
| 1 | 1 |
| Length of Power transfer time(ms) | Strength of WPT |

FIG. 26

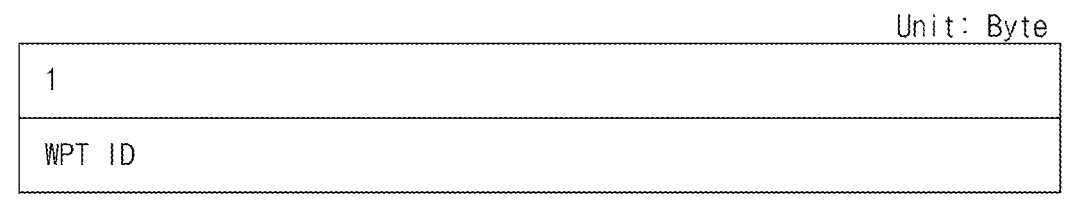

Unit: Byte

| 1 |
|---|
| WPT ID |

FIG. 27

Unit: Byte

| 1 | 1 | 1 | Variable | 2 |
|---|---|---|---|---|
| Total slot number | Slot number | Frame control | Payload | Frame check sequence |
| Frame header | | | Frame body | |

FIG. 28

Unit: bit

| 0 - 2 | 3 - 4 | 5 - 7 |
|---|---|---|
| Frame type | Frame Policy | reserved |

FIG. 29

Unit: Byte

| 1 | 1 | 1 | ... | 1 |
|---|---|---|---|---|
| Status report | Number of WPT IDs | WPT ID-1 | ... | WPT ID-n |
| Payload | | | | |

FIG. 30

Unit: Byte

| 1 | 1 | 1 |
|---|---|---|
| WPT ID | The remaining amount of power in battery | Power Received |
| Payload |||

METHOD FOR TRANSFERRING WIRELESS POWER

CROSS-REFERENCE TO RELATED APPLICATIONS

This is a divisional of U.S. application Ser. No. 14/255,641, filed Apr. 17, 2014, which claims priority under 35 U.S.C. §119 to U.S. Patent Application No. 61/812,879, filed on Apr. 17, 2013, the disclosure of which is incorporated herein by reference in its entirety.

TECHNICAL FIELD

The present invention relates to a method and a system for transferring wireless power, more particularly, to a method and a system which define management protocols for wireless power transfer to multiple devices in Multi-device Wireless Power Management System.

BACKGROUND

A wireless charging system using a magnetic induction phenomenon as wireless power transmission technologies wirelessly transmitting energy has been used.

For example, an electric toothbrush, a cordless razor, or the like, is charged by a principle of electromagnetic induction. In recent years, wireless charging products capable of charging portable devices such as mobile phones, PDAs, MP3 players, notebook computers, or the like, using the electromagnetic induction have been released.

However, the magnetic induction scheme inducing current through magnetic field from a single coil to another coil is very sensitive to a distance between the coils and a relative position of the coils to sharply degrade transmission efficiency even when the distance between two coils are slightly spaced or twisted from each other. Therefore, the wireless charging system according to the magnetic induction scheme may be used only in a short range of several centimeters or less.

Meanwhile, U.S. Pat. No. 7,741,734 discloses a method of wireless non-radiative energy transfer using coupling of resonant-field evanescent tails. The basis of this technique is that two same-frequency resonant objects tend to couple, while interacting weakly with other off-resonant environmental objects, which makes it possible to transfer energy farther away compared to the prior art magnetic induction scheme.

There are the complexity and inconvenience of wire cable chargers by transferring power wirelessly.

SUMMARY

This invention provides management protocols for wireless power transfer to multiple devices in Multi-device Wireless Power Management System. Various functions of Multi-device Wireless Power Management System are justified from this invention. The WPT frames and messages which work between the management block of a charger and the management block or the coupler block of a device, or the coupler block of a charger are defined as well to execute various functions. Also the procedures for each functionality are described based on its frames and messages.

This invention defines management protocols for wireless power transfer to multiple devices in Multi-device Wireless Power Management System. Various functions of management protocols are justified from this invention. The frame format and the messages are defined as well to execute functions. Also the procedures for each functionality are described based on its frame format and messages.

BRIEF DESCRIPTION OF THE DRAWINGS

FIG. 11 is a diagram illustrating MAC layer frame format of MPAN.
FIG. 12 is a diagram illustrating format of command frame.
FIG. 13 is a diagram illustrating payload format of request frame.
FIG. 14 is a diagram illustrating block format of power transfer request.
FIG. 15 is a diagram illustrating block format of power transfer beacon request.
FIG. 16 is a diagram illustrating payload format of response frame.
FIG. 17 is a diagram illustrating block format of power transfer response.
FIG. 18 is a diagram illustrating payload format of acknowledgement frame.
FIG. 19 is a diagram illustrating block format of power transfer response confirmation.
FIG. 20 is a diagram illustrating block format of power transfer request command confirmation.
FIG. 21 is a diagram illustrating block format of power transfer execution command confirmation.
FIG. 22 is a diagram illustrating block format of power level request command confirmation.
FIG. 23 is a diagram illustrating payload format of command frame.
FIG. 24 is a diagram illustrating block format of power transfer request command.
FIG. 25 is a diagram illustrating block format of power transfer execution command.
FIG. 26 is a diagram illustrating block format of power level request command.
FIG. 27 is a diagram illustrating MAC layer frame format for WPT.
FIG. 28 is a diagram illustrating control field.
FIG. 29 is a diagram illustrating payload format of PS beacon.
FIG. 30 is a diagram illustrating payload format of PSF.

DETAILED DESCRIPTION OF EMBODIMENTS

Figure 1:
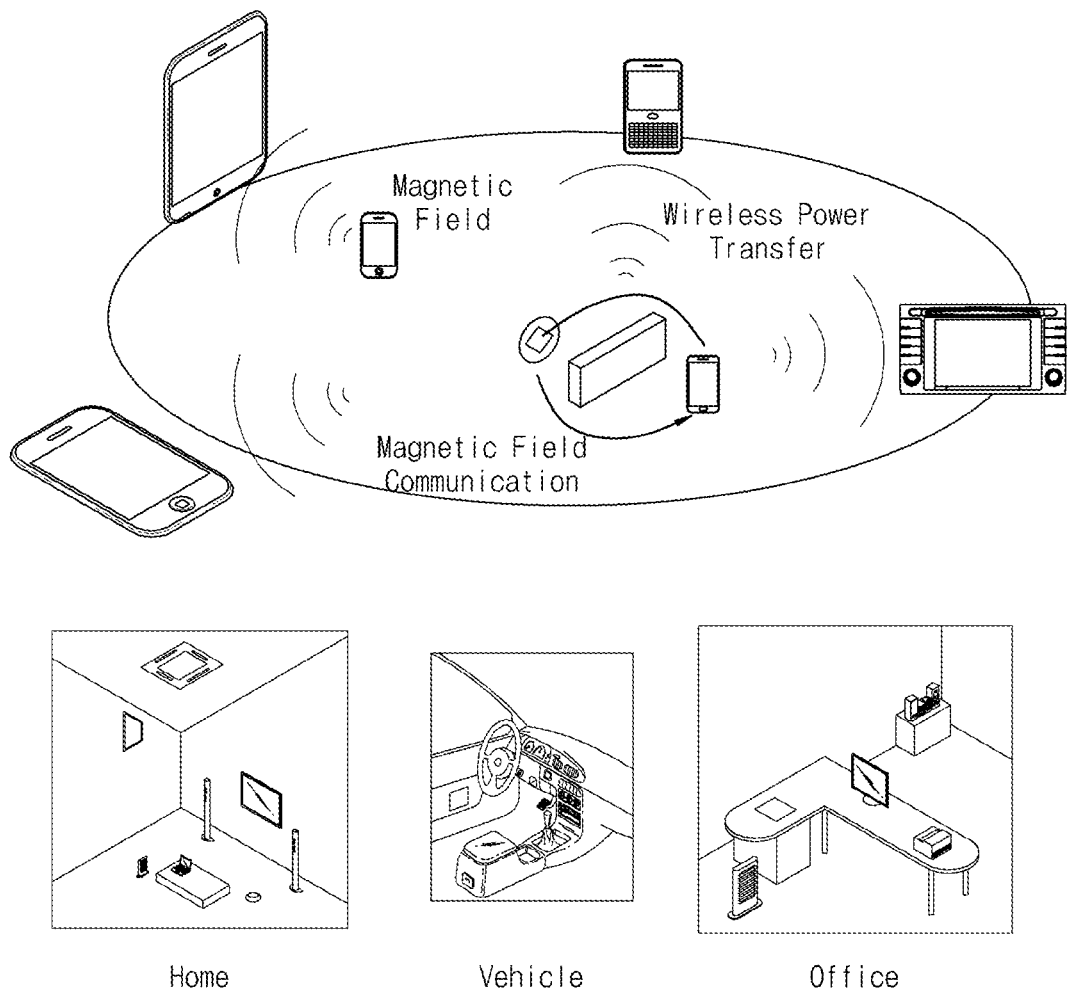
FIG. 1 is a diagram illustrating the wireless power transfer system.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

Information technology—Telecommunications and information exchange between systems—Magnetic field area network (MFAN) Part 2: In-band control protocole for wireless power transfer 1. Scope This invention establishes a system for an in-band network, from which both wireless power transfer and data transmission are carried out simultaneously at a same frequency band. It provides technical solution for a remote and consistent power supply along with a stable network.

For the purpose of this invention, the system is designed based on the principles described in ISO/IEC 15149 (Magnetic Field Area Network). In this way, it is expected to achieve superiority in control of devices, while managing wireless power transfer to multiple devices in request. The focus is on the physical and media access control layer protocol; it will not discuss matters on the upper layer protocols. As together, the PHY and MAC layers should be able to carry out the following tasks: data transmission, signal control, wireless power transfer.

This invention is applicable in various situations and environments, but is expected to perform in excellent in certain use cases:

1) Mobile phones: provide ubiquitous charging environments for portable devices

2) Home appliances: allow unrestrained placement of appliances with the elimination of wire cables and plugs for power supply The media access control layer protocol is designed for the following scope:

1) Variable superframe structure for wireless power transfer to multiple devices 2) Simple and effective network topology for efficient wireless power transfer 3) Dynamic address assignment for efficient timesharing among multiple devices The physical layer protocol is designed for the following scope:

1) One frequency band for both wireless power transfer and magnetic field communication 2) Simple and robust modulation for low-cost implementation and minimized margin of error 3) Variable coding and bandwidth for dynamic charging environment 2. Normative References The following referenced documents are indispensable for the application of this document. For dated references, only the edition cited applies. For undated references, the latest edition of the referenced document (including any amendments) applies.

ISO/IEC 15149-1, Information technology—Telecommunications and information exchange between systems—Magnetic field area network (MFAN)—Part 1: Air Interface 3. Terms and Definitions For the purposes of this document, the following terms and definitions apply.

3.1 Wireless Power Transfer (WPT)

Method of consistent and simultaneous power supply to multiple devices within a range without physical contact 3.2 Magnetic Field Area Network (MFAN)

Specified in ISO/IEC 15149-1

3.3 Magnetic Power Network (MPAN)

In-band wireless power transfer network that incorporates magnetic field area network (MFAN) in its communication and wireless power transfer within a single frequency band 3.4 Magnetic Power Area Network-Coordinator (MPAN-C)

Device that carries out integral operations for magnetic power area network; wireless power transfer, connection and release of devices, and time scheduling of power transfer and data 3.5 Magnetic Power Area Network-Node (MPAN-N)

Devices that comprises magnetic power area network, and that is not a coordinator 4 Symbols and Abbreviated Terms The following acronyms are used in this document:

ARq Association Request
ARs Association Response
ARA Association Response Acknowledgement
ASC Association Status Check
ASK Amplitude Shift Keying
ASRq Association Status Request
ASRs Association Status Response
ASRA Association Status Response Acknowledgement
BPSK Binary Phase Shift Keying
CRC Cyclic Redundancy Check
DA Data Acknowledgement
DaRq Disassociation Request
DaRs Disassociation Response
DaRA Disassociation Response Acknowledgement
DRq Data Request
DRs Data Response
DRA Data Response Acknowledgement
FCS Frame Check Sequence
GSRq Group ID Set-up Request
GSRs Group ID Set-up Response
GSRA Group ID Set-up Response Acknowledgement
LSB Least Significant Bit
MAC Media Access Control
NRZ-L Non-Return-to-Zero Level
PHY Physical Layer Protocol
PLRC Power Level Request Command
PLRCA Power Level Request Command Acknowledgement
PS Power Status
PSF Power Status Feedback
PSFI Power Status Feedback Interval PT Power Transfer
PTBRq Power Transfer Beacon Request
PTEC Power Transfer Execution Command
PTECA Power Transfer Execution Command Acknowledgement
PTPC Power Transfer Permission Command
PTRC Power Transfer Request Command
PTRq Power Transfer Request
PTRs Power Transfer Response
RA Response Acknowledgement
RR Response Request
SIFS Short Inter Frame Space
TDMA Time Division Multiple Access
UID Unique Identifier 5 Overview MPAN is an in-band wireless network system that enables wireless communication and wireless power transfer within a single frequency band. Data and control commands are communicated according to the MFAN system; power is transferred wirelessly according to the consistant WPT system, both at the same frequency band. Due to the characteristics of magnetic field and legal regulations on the power level, the range of MFAN is wider than that of WPT. Within the MPAN, the maximum WPT efficiency is achieved with an MPAN-C taking in charge of every scheduling accordingly for devices in most effective orders.

The MFAN has a low carrier frequency bandwidth of 30 KHz to 300 KHz; the same frequency band is used for WPT. It uses a simple and robust modulation method like BPSK for low cost implementation and low error probability. Also dynamic coding methods like Manchester and NRZ-L are considered in specific against noises. It can provide data transmission speed of several kbps within a distance of several meters. For WPT, unmodulated sine sinusoidal signal is used to enhance WPT efficiency. The MPAN uses a simple and efficient network topology like the 'star topology' for low power consumption. It uses dynamic address assignment for small packet size, so to manage address efficiently as well. Also it incorporates an adaptive link quality control by using various transmission speeds, and coding methods suitable for various MPAN environments.

There are two kinds of devices participating in an MPAN according to their functions: MPAN-C and MPAN-N. Only one MPAN-C may exist within an MPAN, where a number of MPAN-Ns may be registered. As a base station of MPAN, MPAN-C manages connection and release of MPAN-Ns when there is response to its request. For the data transmission, MPAN uses TDMA method; When an MPAN-N joins MPAN managed by MPAN-C, MPAN-C allocates time-slots for the MPAN-N. WPT and data transmission would begin as MPAN-C requests for the responses of MPAN-Ns.

As shown in FIG. 1, MPAN-C and MPAN-Ns are to be located elsewhere within the network. If MPAN-C receives relevant data for WPT-ID, battery information, etc.—from MPAN-Ns, it examines factors like power transfer sequences or the number of time slots for an appropriate WPT. MPAN-C then sends control data back to MPAN-Ns to manage overall WPT operations.

MPAN can be applied to various industries. It may be applied to a situation where electric devices are in need of constant power supply to function properly. For some industries, significant improvement in efficiency is attainable simply by providing power wirelessly. In any cases, duration of battery life no longer becomes a problem; no need to spare broad space for spacious batteries and charging equipment.

Figure 2:
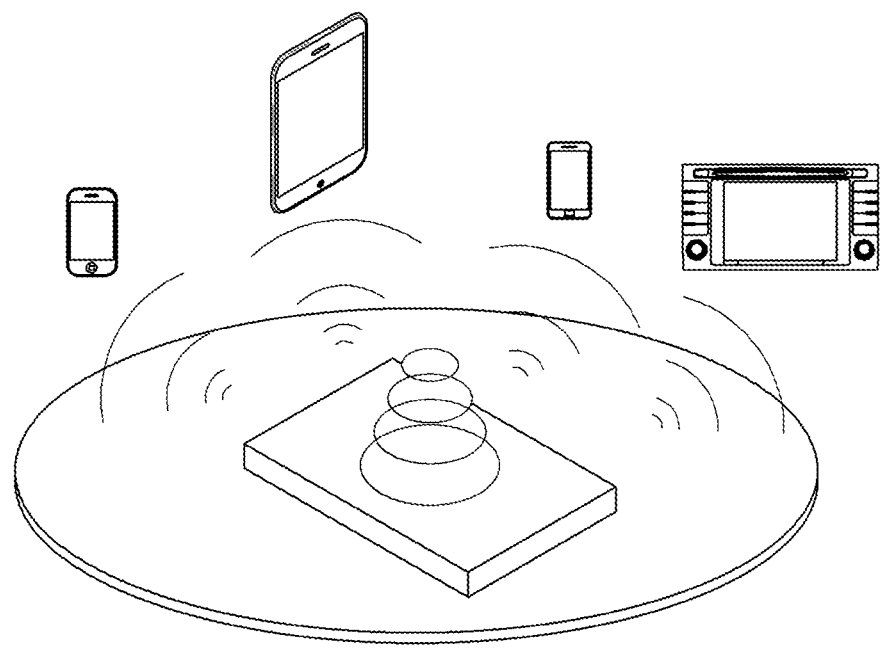
FIG. 2 is a diagram illustrating MPAN applied to mobile devices.
Figure 3:
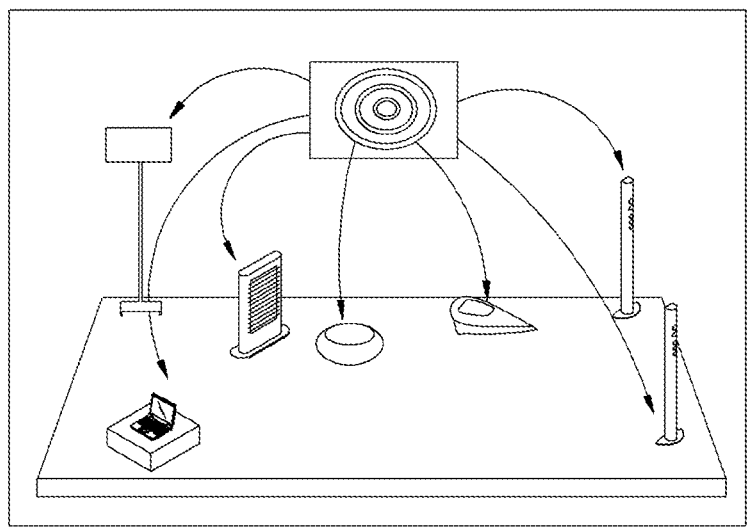
FIG. 3 is a diagram illustrating MPAN applied to home appliances.

As for an example, there has always been a battery issue when it comes to using mobile devices (FIG. 2) due to its running time. MPAN is able to provide a ubiquitous charging environment while on a stable network service. Also for the home appliances (FIG. 3), complex wire cables and plugs can be eliminated; a placement of home appliances at one's convenience becomes possible with MPAN.

6 Network Elements 6.1 General

The elements of MPAN, based on the elements of MFAN, are classified in two: time and physical element. The time element refers to the superframe structure consisting of request period, response period, and spontaneous period. The physical element refers to the MPAN devices: MPAN-C and MPAN-Ns. The most basic unit in the physical element is device. A device may be defined according to its role either as an MPAN-C that manages network, or an MPAN-N that communicates with MPAN-C.

When an MPAN is set up, a node is allocated to be an MPAN-C: the device in charge of the perfect control of association, disassociation, release, and time scheduling for MPAN-Ns. The superframe begins when a device is set as an MPAN-C, and starts to transmit request packets during the request period. Within MPAN, only a single channel is permitted by an MPAN-C; the rest devices within the MPAN become MPAN-Ns. Note that a device within an MPAN may participate as an MPAN-C or MPAN-N depending upon its role. For the connection between an MPAN-C and an MPAN-N, a peer-to-peer connection is used.

6.2 Time Element 6.2.1 General

The MPAN inherits the same time elements used in MFAN, ISO/IEC 15149-1, which is much similar to the method used in TDMA time slot; MPAN-C arranges times slots for individual MPAN-Ns. MPAN-C manages data from the group of MPAN-Ns during response period. There are some new features newly introduced from 15149-2 in relation to WPT.

6.2.2 Time Element for MPAN

Figure 4:
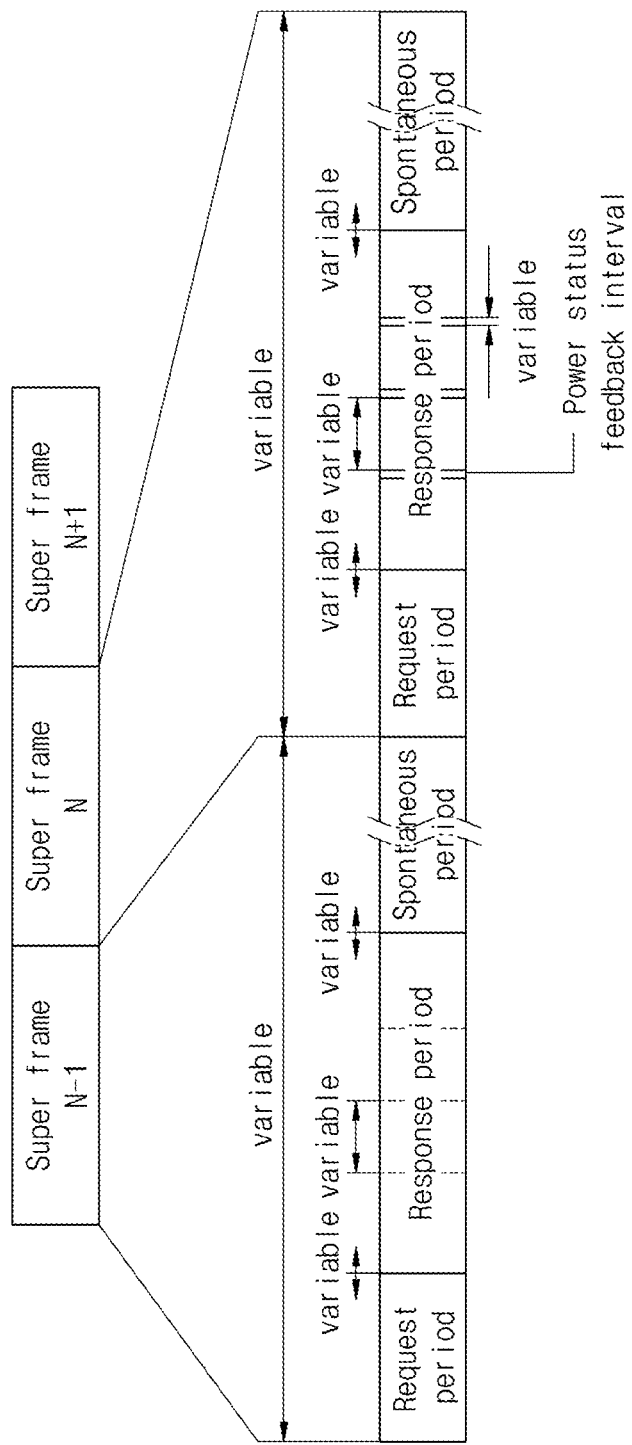
FIG. 4 is a diagram illustrating MPAN superframe structure.
Figure 5:
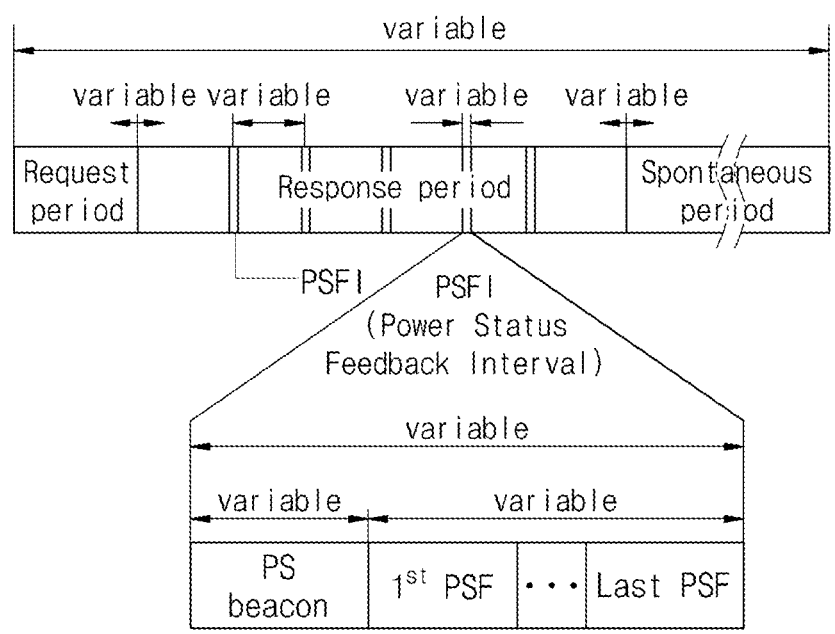
FIG. 5 is a diagram illustrating PSFI in response period.

The time element of MPAN, as shown in FIG. 4, consists of request period, response period, and spontaneous period. The lengths of request and response period are varied; the length of spontaneous period is subject to the length of request and response period.

The superframe begins when MPAN-C transmits a PTRq packet to MPAN-Ns during the request period. When MPAN-N receives the packet, it sends PTRs packet back as a response. According to the PTRs packets received, MPAN-C sends PTBRq packet with information on the WPT time schedule. In that case, relevant MPAN-Ns can receive WPT during the following response periods. During the power status feedback interval, MPAN-Ns will transmit the PSF packet as a response to the PS beacon from MPAN-C.

6.2.2.1 Request Period

During the request period, MPAN-C transmits PTRq packet to invite MPAN-Ns to WPT time schedule. Receiving PTRq packet, MPAN-Ns prepare to take WPT from MPAN-C.

6.2.2.2 Response Period

The response period can be divided into several time slots by the number of MPAN-Ns for WPT. The length of each time slot varies according to the total length of WPT. When MPAN schedules for a response period, MPAN-C allocates slot numbers to each time slots in a numerical order; if there is not an MPAN-N, the slot number will be zero. MPAN-C may assign each time slot either to an individual MPAN-N or to a group of MPAN-Ns. According to a sequence of the schedule, an MPAN-N or all the MPAN-Ns in a group may receive wireless power simultaneously.

During the response period of MPAN, MPAN-Ns send PTRs to MPAN-C if the node is in need of WPT. The MPAN-Ns put in schedule by MPAN-C can receive WPT during the response period. MPAN-C, with the information received, calculates distance to MPAN-Ns. MPAN-C will then return PTBRq to MPAN-Ns to provide detailed time schedule and start WPT at a power level appropriate for the distance.

Distinguishable to the MFAN response period, the response period of MPAN has PSFI. After each time slot, there is a PSFI for quick power status update and abnormal situation. During WPT, when MPAN-N receives the PS beacon in the PSFI, it transmits the PSF packet to MPAN-C for notifying the updated power status as the response for the PS beacon in the PSFI. When abnormal situation is sensed by the MPAN-C, it is notified to all MPAN-Ns in the PSFI by the MPAN-C. When the MPAN-Ns recognize error by receiving the PS beacon, they wait until receiving a request from the MPAN-C.

6.2.2.3 Spontaneous Period

The spontaneous period begins when MPAN-C confirms all PSF packets from MPAN-Ns in the last time slot of the response period and broadcasts PTPC. It will last until MPAN-C will transmit a RR packet again. During this period, low power devices can request power transfer without MPAN-C's request. When MPAN-C receives PTRC packet, it returns PTEC packet. As MPAN-C receives PTECA, the acknowledgement, it provides WPT to low power devices for a certain length of time. Afterward, MPAN-C and MPAN-N sends PLRC and PLRCA correspondently to check on the power level received. This period will last until MPAN-C transmits a request packet, or until it engages into a request period again.

6.3 Physical Element

Figure 6:
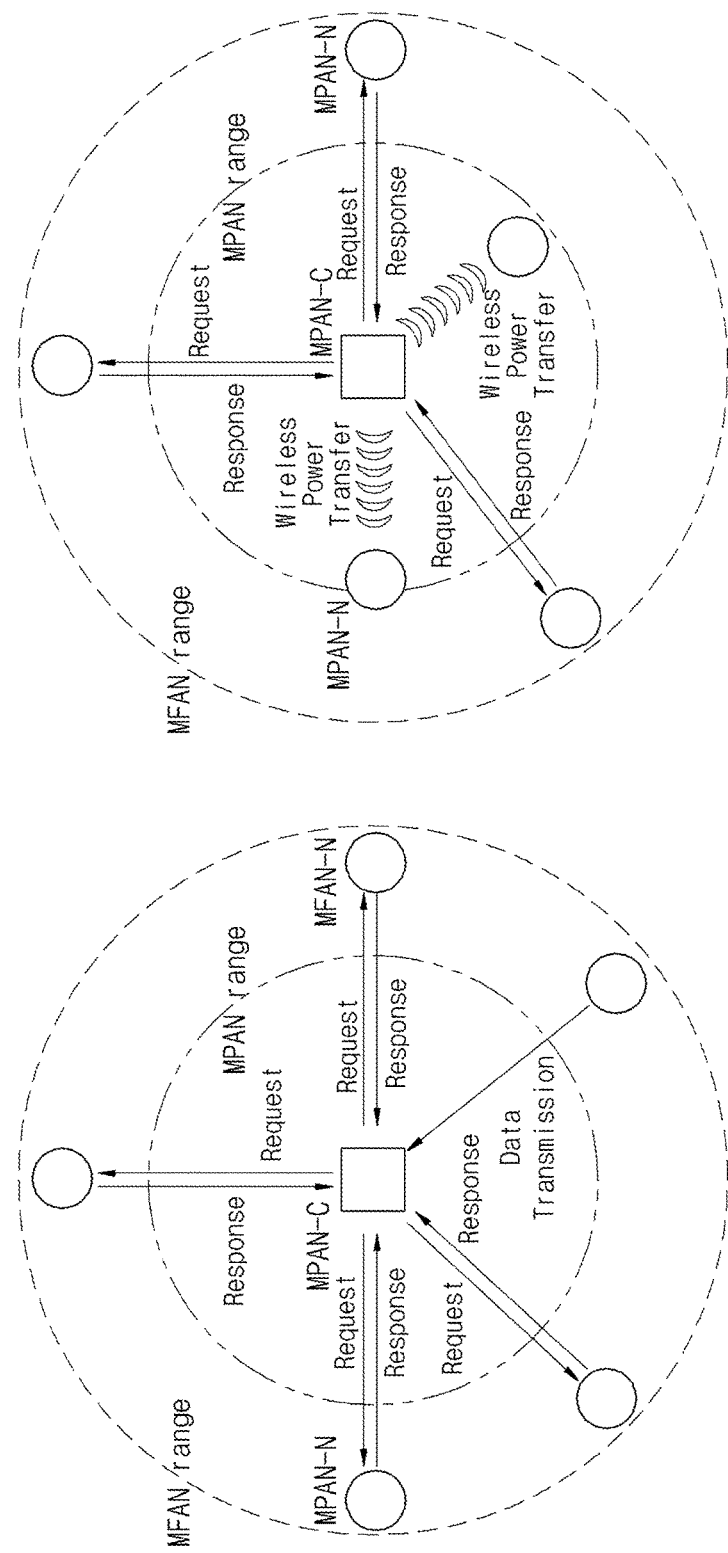
FIG. 6 is a diagram illustrating MPAN physical element.

There are two kinds of physical elements within MPAN, which are MPAN-C and MPAN-N. The basic unit, device, can be categorized either as an MPAN-C or MPAN-N according to its role. An MPAN-C manages entire MPAN. An MPAN-C is able to control MPAN-Ns with RR packets. MPAN-Ns must return response packets back accordingly to MPAN-C in order to proceed with operations. A basic configuration of MPAN is shown in FIG. 6.

6.3.1 Coordinator

MPAN-C is a node that manages MPAN; there is only a single MPAN-C per network. By transmitting an appropriate RR packet, it can manage and control MPAN-Ns within MPAN.

6.3.2 Node

MPAN-N is a device that is associated to an MPAN, and is not an MPAN-C. As much as 65,519 MPAN-Ns can link to a network at the same time. It returns response packets according to the RR packet sent by MPAN-C.

6.4 Address Element

In order to identify MPAN-Ns, MPAN uses an address system for MFAN ID, UID, group ID, node ID, and charging ID.

6.4.1 MFAN ID
Specified in ISO/IEC 15149-1, 5.4.1
6.4.2 UID
Specified in ISO/IEC 15149-1, 5.4.2
6.4.3 Group ID
Specified in ISO/IEC 15149-1, 5.4.3
6.4.4 Node ID
Specified in ISO/IEC 15149-1, 5.4.4

6.4.5 WPT ID

WPT ID is an identifier used during WPT. The ID has an 8-bit address assigned by MPAN-C for quick communication during WPT. The ID is allocated to MPAN-Ns during the request period right before WPT begins. Some WPT IDs are reserved in Table 3.

TABLE 1

Reserved charging ID

| Node ID | Content | Remarks |
| --- | --- | --- |
| 0xFF | All nodes | When broadcasting or transmitting all nodes |
| 0xFE | Unjoined node | Default ID for node |
| 0xF0-0xFD | Reserved | — |

7 Network Status 7.1 General

The MPAN inherits the same network status used in MFAN, ISO/IEC 15149-1. On top of it, there are some newly introduced statuses for MPAN in relation to wireless power transfer: stabilization, invigoration, revitalization status.

7.2 Network Status for MPAN 7.2.1 Stabilization

MPAN in stabilization carries out wireless power transfer in every normal condition. As MPAN-C sends PTRq packet during the request period, MPAN-Ns probe the packet and transmit PTRs packet accordingly during the response period. Based on the information in the PTRs packet, MPAN-C schedules time slots for WPT and transmits the schedule in PTBRq packet. WPT will commence as MPAN-C transmits PTS beacon. MPAN-Ns receive WPT from MPAN-C according to the scheduling sequence during the response period to MPAN-Ns in a time slot. After a time slot for WPT is finished, there is PSFI for quick power status update. When MPAN-Ns receive PS beacon from MPAN-C during the PSFI, MPAN-Ns will send PSF packet upon MPAN-C's requests. After confirming the PSF packets, the MPAN-C will inform MPAN-Ns the start of WPT with PTS beacon, engaging in WPT for the next time slot. During WPT, MPAN-C may stop WPT if it detects error. Otherwise, WPT is completed when MPAN-C receives every PSF packet from the last time slot.

7.2.2 Invigoration

MPAN in invigoration prioritizes devices low in power, and supplies power during spontaneous period to keep them on-line. When an MPAN-N becomes low in power, the MPAN-N will operate in power-saving mode, minimizing its operations. The MPAN-N may request power supply to MPAN-C in order to prevent shutting down. To do so, the MPAN-N will send PTRC to MPAN-C upon receiving PTPC; the MPAN-N will then receive returning PTEC from MPAN-C. MPAN-N will send PTECA and be engaged in WPT. The WPT to an MPAN-N low in battery is to be kept minimal, not to interrupt originally scheduled WPT. If MPAN-N receives power up to a threshold level (to be cut off from the WPT), the WPT will be terminated. After the power transfer in invigoration, MPAN-C sends PLRC to check on the power level received. MPAN-N will return PLRCA and if the power level is above threshold 2, the status will then become stabilization.

7.2.3 Revitalization

MPAN in revitalization provides power transfer to unassociated devices completely dried up of power. MPAN system includes distinctive WPT scenario to power down devices. When an MPAN-N is run out of power, the device is unable to process any signaling operations. Therefore, MPAN-C is unable to control the MPAN-N out of power; although it is not properly scheduled and may interrupt current WPT, the MPAN-N out of power will receive WPT during response period. However, in spontaneous period, MPAN-C transmits PTEC (no ack.) and transfer power regularly, to receive PLRCA for PLRC from revived power-down devices as soon as possible. MPAN-C will then be able to manage and control the revived MPAN-N and undergoes procedures explained from 7.2.2 invigoration.

7.3 MPAN State

MPAN device state includes MPAN-C state and MPAN-N state as justified in ISO/IEC 15149-1. Put in detail, MPAN-C states are divided into standby state, packet analysis state, packet generation state; power transfer state, power transfer standby state, power status packet analysis state, and power status packet generation state. MPAN-N states are composed of hibernation power level detection state, stable hibernation state, general activation state, standby state, packet analysis state, packet generation state; power reception state, power isolation state, power down hibernation state, low power hibernation state, low power packet analysis state, low power packet generation state, PSF activation state, power status packet analysis, power status packet generation.

7.3.1 Coordinator State

7.3.1.1 Communication Procedure

The state of MPAN-C will be at standby when power is turned on. During standby state, the system commands transmission of RR packet and the superframe begins; MPAN-C enters packet generation state. Once the transmission of RR packet is carried out, MPAN-C returns to standby state, waiting for responses. When MPAN-C receives response (or whichever packet) from MPAN-Ns while performing carrier detection during standby state, MPAN-C enters packet analysis state. If the destination ID of the received packet and the node ID of MPAN-C correspond, MPAN-C enters packet generation state. During packet generation state, MPAN-C generates either RA or DA packet accordingly, and sends to MPAN-Ns. The state of MPAN-C will return to standby state, afterward.

In case of error detection within the data packet while on packet analysis, the MPAN-C returns directly to standby state. If errors are detected within the received response packet or destination ID of the received response packet do not corresponds to node ID of MPAN-C during packet analysis state, MPAN-C re-generates RR packet from generation state and re-transmits it to MPAN-Ns after a certain length of time; the MPAN-C returns to standby state. If the failure continues, the procedure will be repeated as many times as configured (maximum of Ntimes). On the (N+1) th attempt, MPAN-C returns to standby state from packet analysis state.

7.3.1.2 Stabilization Procedure

For WPT, MPAN-C enters packet generation state as the superframe begins (system commands), and sends PTRq packet. Once the transmission of PTRq packet is carried out, MPAN-C returns to standby state. When MPAN-C receives PTRs packet from MPAN-Ns, MPAN-C enters packet analysis state. After confirming the packet, MPAN-C enters packet generation state to create PTBRq packet with the schedule for WPT. With the transmission of PTBRq packet, MPAN-C enters power status packet generation state. MPAN-C, after sending PTBRq packet, again sends PTS to MPAN-Ns, informing the start of WPT according to the schedule provided; MPAN-C enters power transfer state.

MPAN-C enters power status packet generation state, when PSFI begins. As MPAN-C transmits PS beacon to all MPAN-Ns during the PSFI, MPAN-C will enter power transfer standby state and receive PSF packets from MPAN-Ns. Receiving PSF packets, MPAN-C enters power status packet analysis state. From power status packet analysis, MPAN-C counts the number of PSF packets and the number of time slots. If the number of PSF does not equal to the number of total PSF packets to be received, MPAN-C returns power transfer standby, waiting for the next PSF packet. If the number of PSF packets equal to the total number of PSF packets, MPAN-C counts on the slot number. If slot number does not equal to the number of total slots (last slot number), MPAN-C enters power status packet generation state to re-send PTS beacon packet for the WPT in the next time slot. If the slot number equals to the number of total time slots, it indicates the WPT time scheduling has finished for the response period; MPAN-C returns standby state. For error detection during power transfer, MPAN-C immediately enters power transfer standby. MPAN-C waits until current time slot times-out, and enter power status packet generation for PSFI.

7.3.1.3 Invigoration Procedure

During invigoration, MPAN-C enters packet generation state as system commands to send PTPC to indicate the start of spontaneous period. MPAN returns to standby to wait for PTRC. When MPAN-C receives PTRC, MPAN-C enters packet analysis to check node ID. If it corresponds, MPAN-C enters packet generation to create PTEC (with ack.) and returns standby. Upon receiving PTECA, it goes packet analysis, then onto power transfer state to engage in power transfer to low power devices. When power transfer times out in spontaneous period, MPAN-C enters standby. After every power transfer in spontaneous period, MPAN-C check on the power level received from the MPAN-Ns that received power. MPAN-C enters from standby to packet generation to generate PLRC. MPAN-C waits from standby for PLRCA. As MPAN-C receives PLRCA, it goes to packet analysis state, then returns standby.

7.3.1.4 Revitalization Procedure

During revitalization, MPAN-C enters packet generation at the beginning of spontaneous period as the system command, to generate PTEC (without ack.) broadcasting. MPAN-N enters power transfer as MPAN-C sends PTEC; MPAN-C returns standby afterward. After the power transfer, the system commands to broadcast PLRC. MPAN-C will enter packet generation and standby consecutively. On receipt of PLRCA, MPAN-C realizes MPAN-Ns in low-power, and engages in invigoration.

Figure 7:
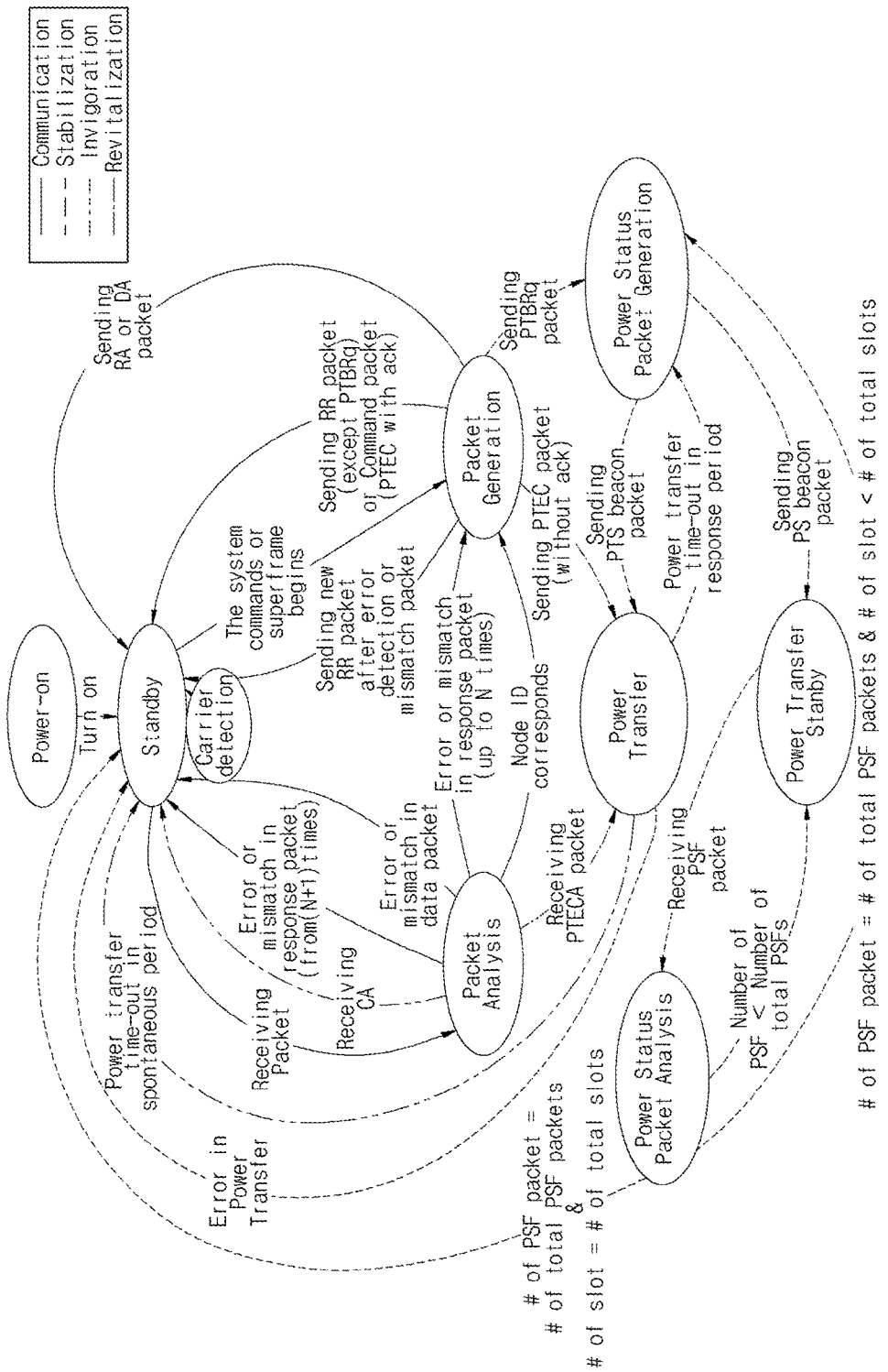
FIG. 7 is a diagram illustrating MPAN-C state diagram.

The states of MPAN-C are as described on FIG. 7.

7.3.2 Node State

7.3.2.1 Communication Procedure

As MPAN-N is turned on, it will enter hibernation power level detection state. According to power level condition, it diverges into power down hibernation, low battery hibernation, and stable hibernation states.

While in stable hibernation state, MPAN-N enters general activation state when wake-up 1 sequence (defined in 8.1) is detected. When MPAN-N receives RR packet, MPAN-N enters packet analysis state to probe on received RR packet. If the destination ID of the RR packet and MPAN-N ID (group ID or node ID) correspond, MPAN-N enters packet generation state. By sending an appropriate response packet to MPAN-C, MPAN-N enters standby state. From standby state, MPAN-N will enter stable hibernation state if it receives appropriate RA packet returned from MPAN-C; if it receives RA packet for other nodes, MPAN-N returns to packet generation state to send response packet again.

If MPAN-N detects error or mismatch during packet analysis (if the IDs will not correspond), MPAN-N enters hibernation power level detection state. MPAN-N may also enter hibernation power detection state from standby state when slot-number is not allocated before it is timed out; if MPAN-N is allocated of slot-number but has not received RA packet during time-out period, or if MPAN-N has received RA for other MPAN-Ns, MPAN-N enters packet generation state. MPAN-N will regenerate and re-transmit response packet to MPAN-C, retuning to standby state. The re-transmission of the response packet may be repeated for as much as N times. On the N+1th time-out, MPAN-N enters hibernation power detection state. If RR packet arrives to MPAN-N while on the carrier detection during standby state, it enters packet analysis state.

If sensor system interruption occurs during stable hibernation state, MPAN-N enters general activation state. According to the command from the system, MPAN-N enters packet generation state. MPAN-N will generate and send appropriate data to MPAN-C, entering to standby state. If MPAN-N receives DA packet, it returns hibernation power level detection state; if not, MPAN-N enters packet generation state to retransmit previous data to enter standby state, until it will receive DA packet. If received DA is for other MPAN-Ns, the MPAN-N also returns to packet generation. On the N+1th time-out, MPAN-N enters hibernation power detection state.

7.3.2.2 Stabilization Procedure

MPAN-N undergoes a little more complicated states for WPT. MPAN-N in stabilization will receive wake-up 1 (along with PTRq) during request period, which wakes-up MPAN-N in stable hibernation state. MPAN-N will enter general activation state as MPAN-N receives PTRq packet, and packet analysis state in consequence. If the ID in packet corresponds with node ID, MPAN-N goes to packet generation state to create PTRs. At transmission MPAN-N enters hibernation power detection state. When MPAN-N receives PTBRq from MPAN-C, MPAN-N wakes up to general activation state, analyzes to receive WPT from packet analysis state. If the packet is PTBRq, then MPAN-N probes on the packet and returns to hibernation power level detection state. When MPAN-C sends PTS packet along with wake-up3, MPAN-N enters PSF activation state, then onto power status packet analysis state. According to the time schedule on the previous PTBRq, the path for MPAN-N diverges into two. One will lead MPAN-N to power reception right away, and the other will guide MPAN-N to power isolation state to maximize overall WPT efficiency.

If MPAN-N has received PTS beacon and is scheduled for the following time slot, it will enter power reception state to receive WPT. When power transfer finishes, MPAN-N enters hibernation power level detection state, before entering to stable hibernation state. From stable hibernation state, MPAN-N that has received PS beacon will go through PSF activation, power status packet analysis and power status packet generation to create PSF. Sending PSF, MPAN-N will enter hibernation power level detection state to appropriate hibernation state. MPAN-N will wait for next PTS or other relevant packets from hibernation states.

If MPAN-N has received PTS beacon and is not scheduled for the following time slot, MPAN-N enters power isolation state. When PSFI begins, MPAN-N in power isolation state enters hibernation power level detection state. MPAN-N will wait for PS beacon to go through PSFI procedures. MPAN-N will wait for next PTS or other relevant packets from hibernation states.

7.3.2.3 Invigoration Procedure

MPAN-N in low power hibernation state may request for power transfer during spontaneous period: invigoration. While in low power hibernation state, MPAN-N may detect wake-up 2 signal and enter low power packet analysis state. If the packet is PTPC, MPAN-N enters low power packet generation state to generate PTRC to request for power transfer; MPAN-N returns hibernation power level detection state. As MPAN-N receives PTEC, MPAN-N wakes to low power packet analysis state, then send PTECA from low power packet generation state to confirm power transfer. After sending PTECA, MPAN-N enters power reception state. When power transfer finishes, MPAN-N enters hibernation power level detection state, then onto an appropriate hibernation state. The following PLRC will wake MPAN-N to either low power packet analysis or to packet analysis state, depending on the power level of MPAN-N. MPAN-N will enter appropriate packet generation state to send PLRCA, and enter hibernation power level detection. The power supplied at this time is of small amount, little affecting WPT originally intended for other MPAN-Ns.

7.3.2.4 Revitalization Procedure

When MPAN-N is in revitalization, MPAN-N is in power-down state. The power-down MPAN-N can receive power transfer automatically within MPAN range due to the nature of magnetic resonance. To make such procedure much effective, MPAN-C regularly broadcasts PTEC (no ack.) along with power transfer during spontaneous. If power down device is turned on and enter low-battery hibernation state, MPAN-N will reply PLRCA to PLRC after power transfer. From then on, MPAN-N engages in invigoration.

Figure 8:
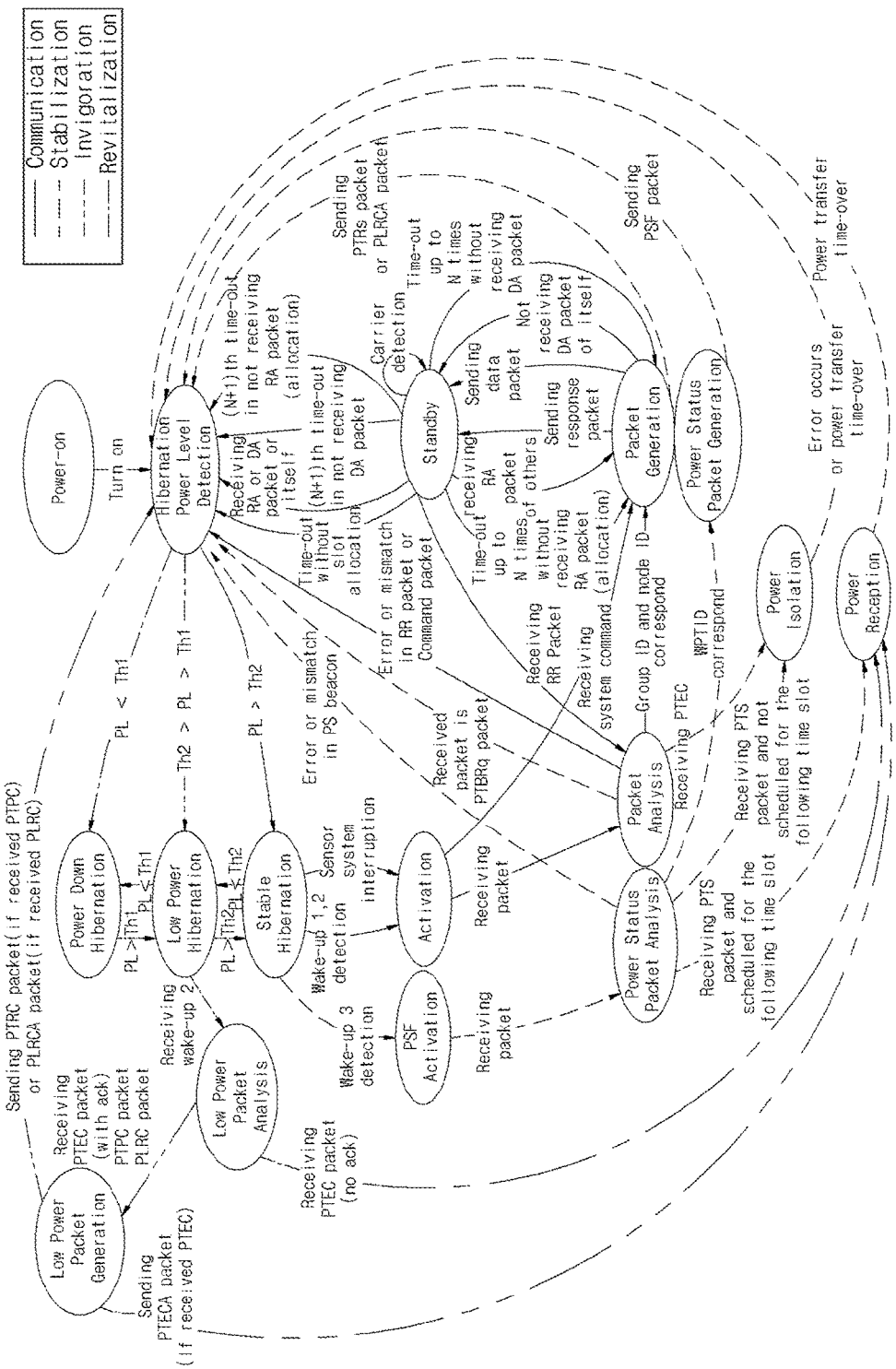
FIG. 8 is a diagram illustrating MPAN-N state diagram.

The states of MPAN-N are as described on FIG. 8.

8 Physical Layer Frame Format

8.1 General

Figure 9:
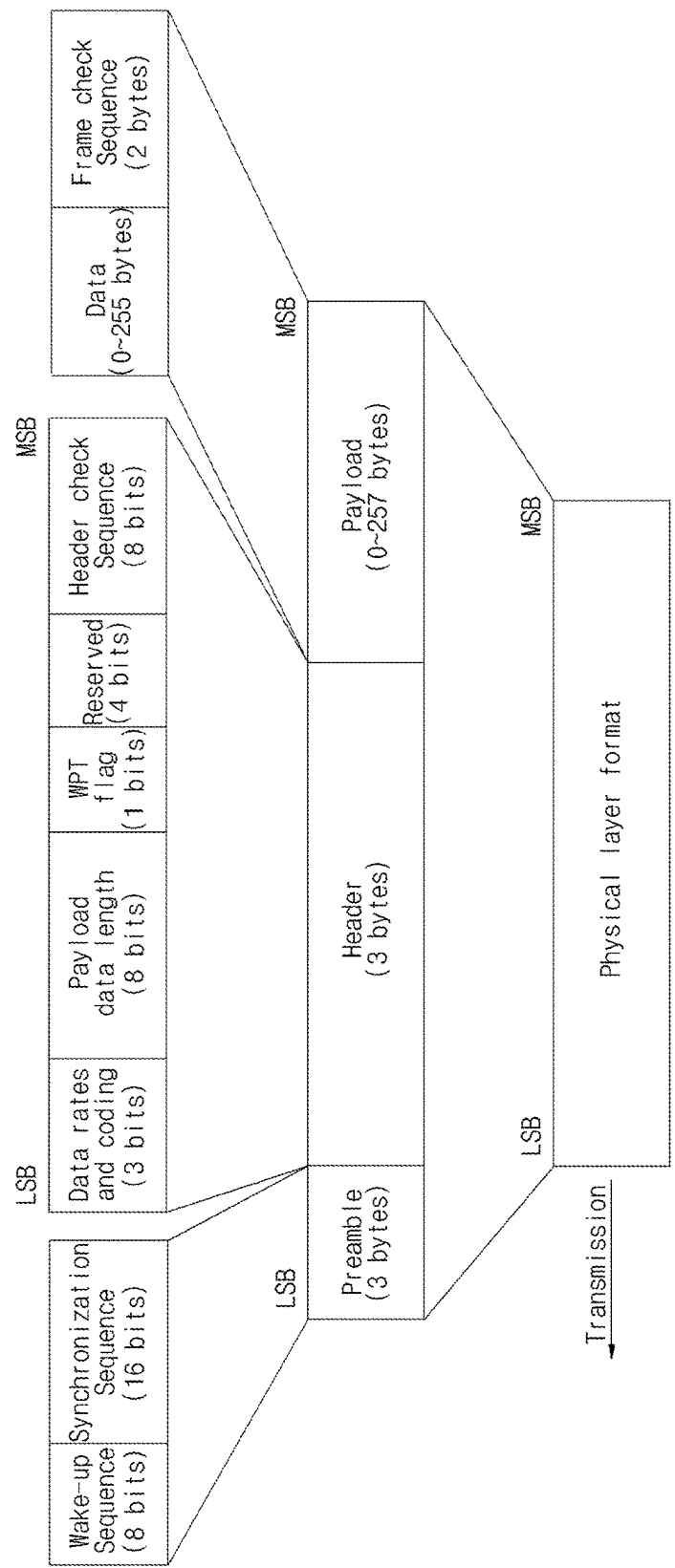
FIG. 9 is a diagram illustrating PHY layer frame format.

This section describes the physical layer frame format of MPAN, adopting that of MFAN. As shown in FIG. 9, the PHY layer frame consists of three components: the preamble, the header, and the payload. When transmitting the packet, the preamble is sent first, the header follows, and finally the payload comes last. An LSB is the first bit transmitted.

8.2 Preamble

Figure 10:
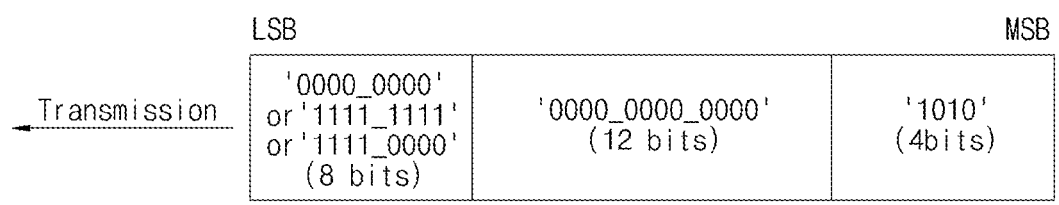
FIG. 10 is a diagram illustrating preamble format.
Figure 31:
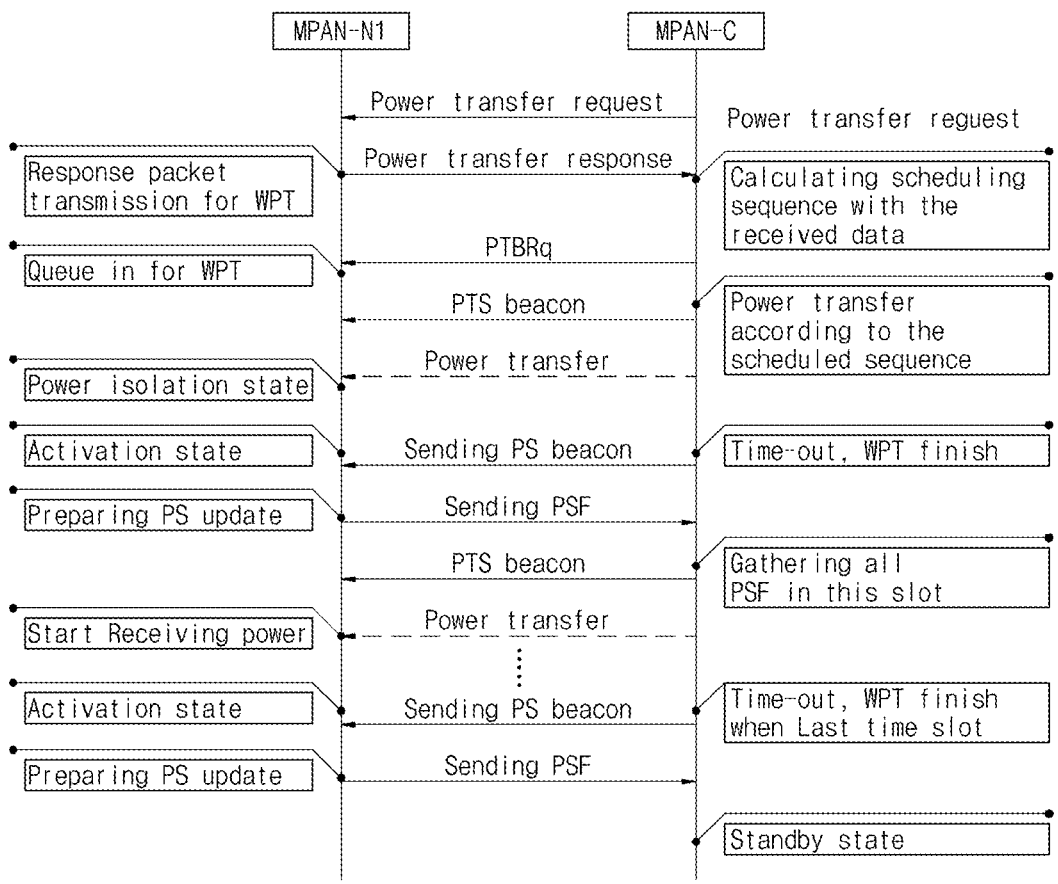
FIG. 31 is a diagram illustrating procedure in stabilization (without error).
Figure 32:
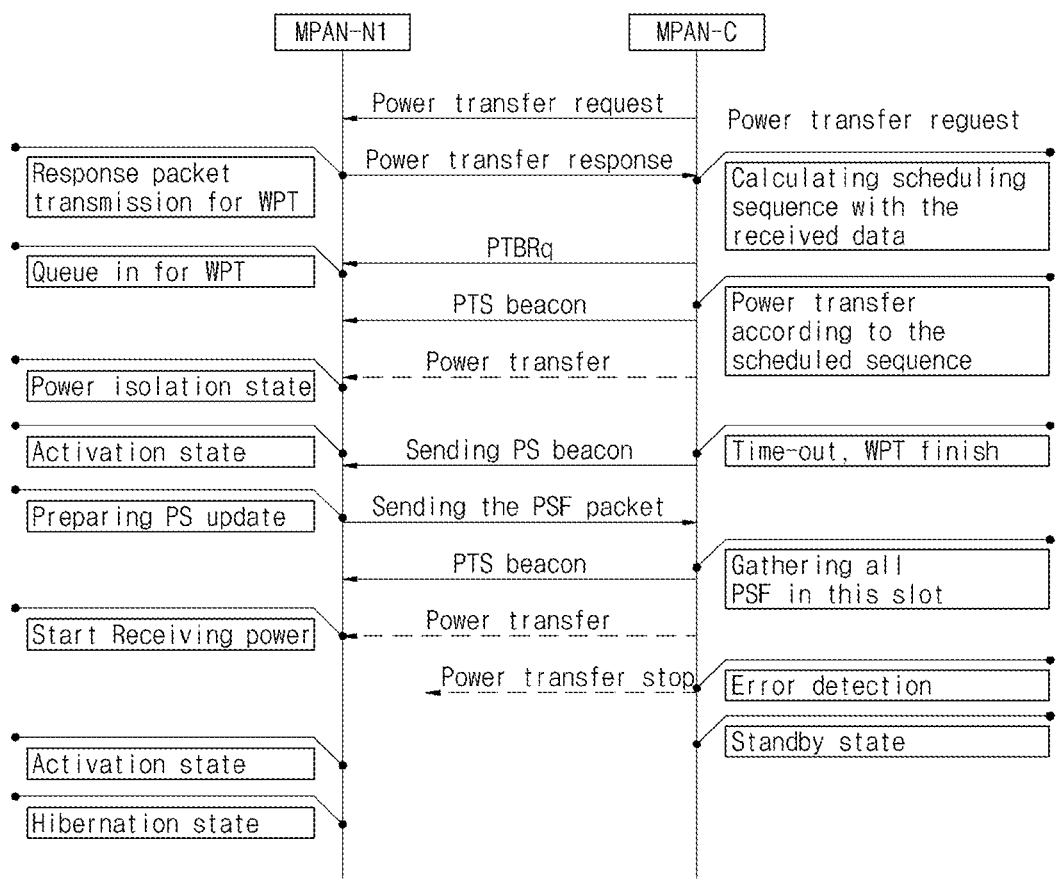
FIG. 32 is a diagram illustrating procedure in stabilization (error detection).
Figure 33:
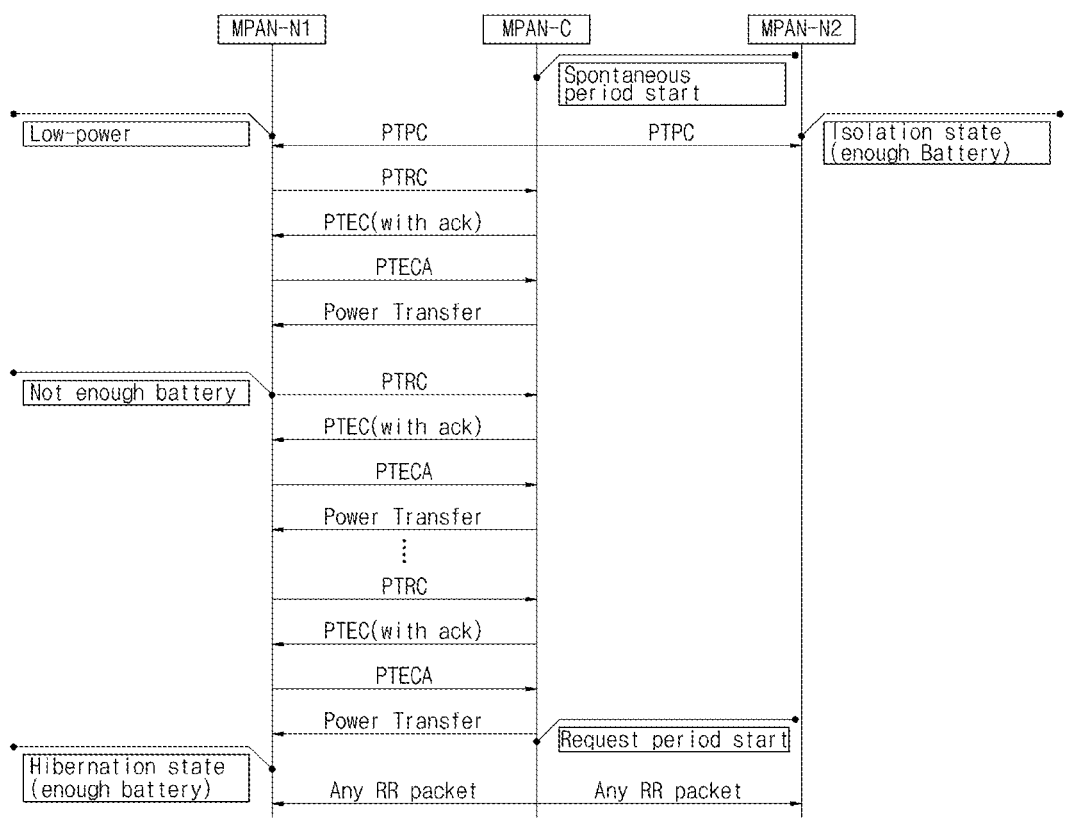
FIG. 33 is a diagram illustrating procedure in invigoration.
Figure 34:
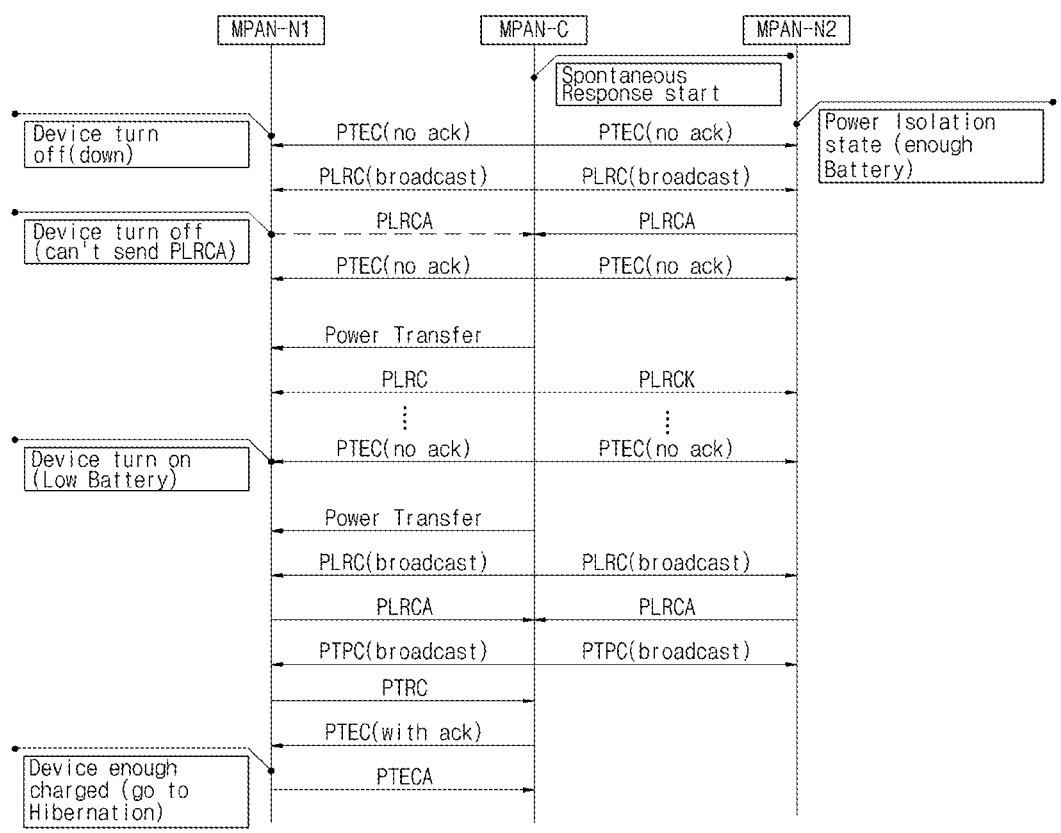
FIG. 34 is a diagram illustrating procedure in revitalization.

As shown in FIG. 10, the preamble consists of two parts: a wake-up sequence and a synchronization sequence. An 8-bit wake-up sequence is categorized in two types: one is for general MFAN communication, and the other one is for WPT. The wake-up 1 sequence for MFAN communication consists of [0000, 0000], and the wake-up 2 sequence for command consists of [1111 1111] and wake-up 3 sequence for WPT consists of [1111 0000]. The following 16-bit synchronization sequence consists of a 12-bit sequence [0000 0000 0000]. A 4-bit sequence of [1010] comes after the synchronization sequence. The wake-up 1 sequence is only included in the preamble of RR packet during the request period; the wake-up 2 sequence is included in the preamble of PTEC packet during the spontaneous period; the wake-up 3 sequence is included in the preamble of PS beacon during the response period. The synchronization sequence is used for the packet acquisition, symbol timing, and the carrier frequency estimation.

The preamble is coded using the TYPE 0 defined in 8.1.3. The wake-up sequence is modulated by ASK, but the synchronization sequence is coded using BPSK.

8.3 Header
Specified in ISO/IEC 15149-1, 7.1.3
8.3.1 WPT Flag
The WPT flag frame of the header verifies whether the entire frame is for WPT, or MFAN. If the frame has the value of 1, then it is for WPT; if it has the value of 0, then it is for MFAN.
8.4 Payload
Specified in ISO/IEC 15149-1, 7.1.4
8.5 Frame check sequence
Specified in ISO/IEC 15149-1, 7.1.5
9 MAC Layer Frame Format
9.1 General
The MAC frame of MPAN consists of frame header and frame body. It inherits the MAC layer frame format justified in ISO/IEC 15149-1. Frame header has information for data transmission to devices. Frame body has the actual data to be transmitted.
9.2 Frame Format for MPAN
All the MAC layer frames consist of frame header and frame body as shown in FIG. 11.
1) Frame header: Consists of the MFAN ID, frame control, source node ID, destination node ID, and sequence number. Frame header contains information for the transmission.
2) Frame body: Consists of the payload that contains actual data to be transmitted to MPAN devices and FCS used to check errors within the payload.
9.2.1 Frame Header
Specified in ISO/IEC 15149-1, 8.2.1
9.2.2 Frame Body
Specified in ISO/IEC 15149-1, 8.2.2
9.2.3 Frame Type
There are four types of frame: request frame, response frame, data frame, and acknowledgement frame.

TABLE 2

Frame type value

| Frame type | Value (Binary) | Content | Period |
|---|---|---|---|
| Request frame | 000 | Request for the response of association (ARq), disassociation (DaRq), association status (ASRq), data transmission (DRq), power transfer (PTRq), power transfer beacon (PTBRq), and so on. | Request |
| Response frame | 001 | Response for the request of association (ARs), disassociation (DaRs), association status (ASRs), data transmission (DRs), power transfer (PTRs), and so on. | Response |
| Data frame | 010 | Data transmission without the request of coordinator | Spontaneous |
| Acknowledgement frame | 011 | Acknowledgement of the response (RA*) data transmission (DA), and command (CA) for nodes | Response, Spontaneous |
| Command frame | 100 | Command for power transfer permission (PTPC), power transfer execution (PTEC), power level request (PLRC) to devices | Spontaneous |

*RA includes ARA, DaRA, ASRA, and so on 9.2.3.1 Request Frame
Specified in ISO/IEC 15149-1, 8.3.1
9.2.3.2 Response Frame
Specified in ISO/IEC 15149-1, 8.3.2
9.2.3.3 Data Frame
Specified in ISO/IEC 15149-1, 8.3.3
9.2.3.4 Acknowledgement Frame
Specified in ISO/IEC 15149-1, 8.3.4
9.2.3.5 Command Frame
The command frame consists of UID, command code, command block, and FCS. If the value for control code is 0, then it is WPT request; if the value is 1, then it is WPT response.
9.2.4 Payload Format
Payload format is composed of request frame, response frame, data frame, and acknowledgement frame.
9.2.4.1 Request Frame
As shown in FIG. 13, payload for the request frame consists of group ID, request code, length, and more than one request block. When group ID is 0xFF, it indicates that MPAN-C requests a response from all MPAN-N groups.
1) Group ID
Group ID field consists of 1 byte and is used to send RR packets to certain groups. For the details of the group ID, refer to 6.4.3.
2) Request Code
Request code in payload of a request frame is shown in Table 3.

TABLE 3

Payload request code of request frame

| Category | Request code | Content | Remarks |
|---|---|---|---|
| Network | 0x01 | Association request | Request for association response to unjoined nodes |
| | 0x02 | Disassociation request | Request for disassociation response to joined nodes |
| | 0x03 | Association status request | Request for association status response to joined nodes |
| | 0x04-0x0F | Reserved | — |
| Data | 0x11 | Data request | Request for data transmission to joined nodes |
| | 0x12-0x1F | Reserved | — |
| Configuration | 0x21 | Group ID set-up request | Request for group ID change to joined nodes |
| | 0x22-0x2F | Reserved | — |
| Wireless Power Transfer | 0x31 | Power transfer request | Request for power transfer response to joined nodes |
| | 0x32 | Power transfer beacon request | Request for power transfer beacon to joined nodes |
| | 0x33-0x3F | Reserved | — |
| Reserved | 0x40-0xFF | Reserved | — |

3) Length
Length field consists of 1 byte; it indicates the total length of request block. The length field value is variable to the length and the number of request blocks.
4) Request Block
The data format of request block is composed differently according to request codes; more than one request blocks can be included in the payload of request frame.
The details for the data format of each request block are as follows:
a) Association request
Specified in ISO/IEC 15149-1, 8.4.1.4
b) Disassociation request
Specified in ISO/IEC 15149-1, 8.4.1.4
c) Association status request
Specified in ISO/IEC 15149-1, 8.4.1.4
d) Data request
Specified in ISO/IEC 15149-1, 8.4.1.4 e) Group ID set-up request
Specified in ISO/IEC 15149-1, 8.4.1.4
f) Power transfer request
The block format of PTRq is shown in FIG. 14. The first 2 bytes are for the node ID of MPAN-N for PTRq. If the node ID is 0xFFFF, PTRq is requested to all MPAN-Ns under the group ID. The next 1 byte is for the slot number. The last 1 byte is for the signal strength at transmission from MPAN-C, and is measured in dB.
g) Power transfer beacon request
The block format of PTBRq is shown in FIG. 15. The first 1 byte is for the WPT ID of MPAN-N for PTBRq. If the WPT ID is 0xFF, PSBRq is requested to all MPAN-Ns. The next 1 byte is for the slot number; next 2 bytes for the length of power transfer frame; last 2 bytes for the power level at transmission. The last field, power transfer level, consists of significant figure and (n−2) power. Simply put to equation, the power transfer level is (Significant figure)*$10^{(n-2)}$ W.

9.2.4.2 Response Frame
The payload format of response frame has responsive information to the request of MPAN-C. The response frame payload is shown in FIG. 16. The first byte is for the group ID, the second byte is for the response code, the third byte is for the response date length (L), and the next L bytes are for the response data.
1) Group ID
The group address field consists of 1 byte and is used to send RR packets to a certain group. For the details of the group ID, refer to 6.4.3.
2) Response Code
Response code types are shown in Table 4.

TABLE 4

Response code of response frame payload

| Category | Response code | Content | Remarks |
|---|---|---|---|
| Network | 0x01 | Association response | Transmission of node UID |
|  | 0x02 | Disassociation response | Transmission of node UID |
|  | 0x03 | Association status response | Transmission of node UID |
|  | 0x04-0x0F | Reserved | — |
| Data | 0x11 | Data response | Transmission of requested data |
|  | 0x12-0x1F | Reserved | — |
| Set-up | 0x21 | Group ID set-up response | Transmission of UID and group ID after changes in group ID |
|  | 0x22-0x2F | Reserved | — |
| Wireless Power Transfer | 0x31 | Power transfer response | Transmission of requested data to receive wireless power transfer |
|  | 0X32-0x3F | Reserved | — |
| Reserved | 0x40-0xFF | Reserved | — |

3) Length
Length field consists of 1 byte and indicates the length of response data; it is variable according to the response data.
4) Response Data
Response data are divided into ARs, DaRs, ASRs, DRs, GSRs, and PTRs. The response data format is as follows:
a) Association response
Specified in ISO/IEC 15149-1, 8.4.2.4
b) Disassociation response
Specified in ISO/IEC 15149-1, 8.4.1.4
c) Association status response
Specified in ISO/IEC 15149-1, 8.4.1.4
d) Data response
Specified in ISO/IEC 15149-1, 8.4.1.4
e) Group ID set-up response
Specified in ISO/IEC 15149-1, 8.4.1.4
f) Power transfer response
The block format of PTRs is shown in FIG. 17. The PTRs data consist of 2 bytes for remaining amount of power in battery, 2 bytes for required power level by node. The next 4 bytes are for the signal level: 2 bytes for reception at node, and 2 bytes for transmission at coordinator. Probing on power levels and signal level, MPAN-C calculates distances to MPAN-N; efficient level of power may be transferred.

9.2.4.3 Data Frame
Specified in ISO/IEC 15149-1, 8.4.3

9.2.4.4 Acknowledgement Frame
The RA frame payload has data referring to the received response packet. The RA payload format is shown in FIG. 18. The first byte is for the group ID, the second byte is for the response confirmation code, the third byte is for the length (L), and the next L bytes are for the response confirmation blocks.
1) Group ID
The group ID field consists of 1 byte and is used to send RR packets to a certain group. For the details of the group ID, refer to 6.4.3.
2) Response Confirmation Code
Response confirmation code types are shown in Table 5.

TABLE 5

Response confirmation code

| Category | Reception confirmation code | Content | Remarks |
|---|---|---|---|
| Network | 0x01 | Association response confirmation | UID and assigned node ID transmission of nodes |
|  | 0x02 | Disassociation response confirmation | UID and node ID transmission of nodes |
|  | 0x03 | Association status response confirmation | UID transmission of nodes |
|  | 0x04-0x0F | Reserved | — |
| Data | 0x11 | Data response confirmation | Confirmation of data transmission to a joined node |
|  | 0x12-0x1F | Reserved | — |
|  | 0x21 | Group ID set-up response confirmation | UID and group ID transmission after group ID changes |
| Set-up | 0x22-0x2F | Reserved | — |
| Wireless Power Transfer | 0x31 | Power transfer response confirmation | Confirmation of power transfer response |
|  | 0x32 | Power transfer execution command confirmation | Confirmation of power transfer executtion command |
|  | 0x33 | Power level request command confimation | Confirmation of power transfer request command |
|  | 0x34-0x3F | Reserved | — |
| Reserved | 0x41-0xFF | Reserved | — |

3) Length
The length field consists of 1 byte; it indicates the length of response confirmation data and is variable according to the response confirmation data.

4) Response confirmation block

Response confirmation block is divided into ARs confirmation, DaRs confirmation, ASRs confirmation, DRs confirmation, and GSRs confirmation. The block formats of the response confirmation are as follows:

a) Association response confirmation
Specified in ISO/IEC 15149-1, 8.4.4.4
b) Disassociation response confirmation
Specified in ISO/IEC 15149-1, 8.4.4.4
c) Association status response confirmation
Specified in ISO/IEC 15149-1, 8.4.4.4
d) Data response confirmation
Specified in ISO/IEC 15149-1, 8.4.4.4
e) Group ID set-up response confirmation
Specified in ISO/IEC 15149-1, 8.4.4.4
f) Power transfer response confirmation The block format for power transfer response confirmation is shown in FIG. 19. The first 2 bytes are for the destination node ID; the last 1 byte is for the WPT ID to be assigned to.

g) Power transfer request command confirmation

The block format for power transfer request command confirmation is shown in FIG. 20. The first 2 bytes are for the destination node ID. Next 1 byte is for the command policy (accept if 0, deny if 1); the last 1 byte is for the WPT ID to be assigned to.

h) Power transfer execution command confirmation

The block format for power transfer execution command confirmation is shown in FIG. 21. The first 2 bytes are for the destination node ID; the last 1 byte is for the received power strength.

i) Power Level request command confirmation

Figure 22:
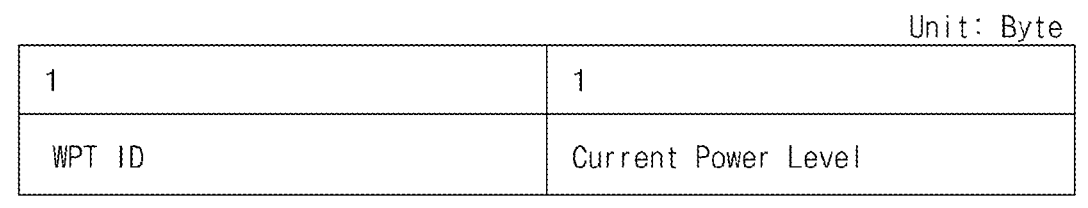

The block format for power level request command confirmation is shown in FIG. 22. The first 2 bytes are for the destination WPT ID; the last 1 byte is for the received power strength.

9.2.4.5 Command Frame

The block format of command frame is shown in FIG. 23. The first 8 bytes are for the UID, next 1 byte is for the command code. Following L bytes are for the command block.

1) UID
UID field has 8 bytes in length.
2) Command code
Command code defines the usage of command blocks. Only the code values for WPT are defined at this point in time; other values are reserved for up to 30 functions to be included in the future.

3) Command block

The format of command block is varied according to the command code used. Only one command block may be appropriately used: either a request or confirmation block.

The details of each command block is as follows:

a) Power transfer request command

Power transfer request command block is composed of 2 bytes. First 1 byte is for the power level, and the following 1 byte is for the time.

b) Power transfer execution command

Power transfer execution command block is composed of 2 byte; it has information of the time length of WPT.

c) Power transfer permission command

The block for power transfer permission command is omitted; it is identifiable from the header by putting appropriate value for its type.

d) Power level request command

The block for power level request command is composed of 1 byte. It is identifiable from the header, but specifies its destination by putting WPT ID.

9.3 Frame Format for Power Status Feedback

All the frames of WPT consist of frame header and frame body as shown in FIG. 27.

1) Frame header: Consists of the Slot number, Frame control. Frame header contains information for the transmission.

2) Frame body: Consists of the payload that contains PSF data to be transmitted to MPAN devices, and FCS that is used to check errors within the payload.

9.3.1 Frame Header

Frame header has information for the Power transmission Feedback 9.3.1.1 Total Slot Number It includes the total number of slots; it has 1 byte.

9.3.1.2 Slot Number

It represents the current time slot number; it has 1 byte.

9.3.1.3 Frame Control

Frame control fields consist of frame type, frame policy; its format is shown in FIG. 28.

Each field is explained as follows:

1) Frame type

Frame type field consists of 3 bits; refer to 9.3.3 for the details on frame types.

2) Frame Policy

TABLE 7

| Frame policy | | |
|---|---|---|
| Policy type | value | Content |
| Response frame transmission policy | 00 | Request for the response |
| No transmission Policy | 01 | Request for no response |

9.3.2 Frame Body

Frame body is variable in length and consists of payload and FCS. Each payload has a different format according to the frame type in the frame control field; FCS is used to check for errors in the frame.

9.3.2.1 Payload

The size of payload for WPT will range between 0 to 256.

9.3.2.2 Frame Check Sequence

FCS is 8 bits in length, and is used to verify whether frame body was received without error. It is generated by using the following 8th standard generator polynomial:

$$G(x)=x^8+x^2+x^1+1$$

TABLE 6

Command code of command frame payload

| Category | Command code | Content | Remarks |
|---|---|---|---|
| Power transfer | 0x00 | Power transfer startpermission command | Permission of transfer packet in spontaneous period |
| | 0x01 | Power transfer request command | Request of wireless power transfer from node in invigoration |
| | 0x02 | Power transfer execution command | Execution of wireless power transfer from coordinator |
| | 0x03 | Power level request command | Request for power level status of node |
| | 0x04-0x0F | Reserved | — |
| reserved | 0x10-0xFF | Reserved | — |

9.3.3 Frame Type

Frame type field consists of 3 bits. There are two types of frames: request frame and response frame.

TABLE 8

Frame type

| Frame Type | Value | Content | Period |
|---|---|---|---|
| Power status beacon frame | 000 | Power status beacon frame | Response |
| Power transfer start beacon frame | 001 | Power transfer start beacon frame | Response |
| Power status feedback frame | 002 | Power status feedback frame | Response |
| Reserved | 010-111 | | |

9.3.4 Payload Format
9.3.4.1 PS Beacon

There is a PSFI during the response period of MPAN-C in between WPT. PSFI begins whenever a time slot for WPT to a certain MPAN-N or a group ends. It remains until MPAN-C receives all PSF frames from the MPAN-Ns. The frame format during the PSFI has short length and simple structure to avoid time waste while on WPT.

When PSFI begins, MPAN-C transmits PS beacon to have a quick update on power status and abnormal situation. The request frame format is shown in FIG. 29.

1) Status report

Status report determines process of PS beacon. The purpose of PS beacon is varied according to the usage of status report as shown on Table 9.

TABLE 9

Status report

| Value | Frame status |
|---|---|
| 0x00 | Normal situation |
| 0x01 | Abnormal situation |
| 0x02-0xff | Reserved |

2) Number of WPT IDs

It is the number of WPT IDs which are enumerated in the frame body. It represents the number of MPAN-Ns allowed to take WPT.

3) WPT ID

MPAN-C selects a certain MPAN-N or a group to respond to the PS beacon. In the PS beacon, WPT ID is used to shorten the length of beacon and to simplify beacon structure. Details for the WPT ID are described in the section 6.4.5.

9.3.4.2 Power Transfer Start Beacon

Block for power transfer start beacon is omitted; it is identifiable from the header by putting appropriate value for its type.

9.3.4.3 PSF

1) WPT ID

Specified in the section 6.4.5.

2) The remaining amount of power in battery

When MPAN-C requests battery information, MPAN-N sends information on the remaining amount of the battery. 8 bits are reserved for the battery information.

3) Received Power

For the efficient WPT scheduling, MPAN-N sends information on the power received.

10 MAC Layer Function
10.1 General

In the MAC layer of MPAN, the following functions are considered to effectively manage an MPAN: association, disassociation, ASC process, data transmission, group ID set-up, stabilization, invigoration, and revitalization process. The MAC layer functions of WPT in stabilization, invigoration, and revitalization will be covered from MPAN; the others are justified from ISO/IEC 15149-1, 9.

10.2 Stabilization

MPAN-C may send PTRq packet to MPAN-Ns. MPAN-Ns wishing to receive power will return PTRs packet to MPAN-C. According to the PTRs packets received, MPAN-C will compute WPT schedule. Once schedule is set, MPAN-C will transmit PTBRq packet to all MPAN-Ns with schedule information. Soon after the transmission of PTBRq packet, MPAN-C also sends PTS beacon, indicating the start of power transfer. On the basis of time schedule from PTBRq, MPAN-N will enter power isolation state or power reception state accordingly. When power transfer times out as scheduled, MPAN-C send PS beacon for power status updates; MPAN-N will reply with PSF. When all PSF frames are gathered, power transfer for the next time slot begins.

If MPAN-C detects an error during WPT, MPAN-C stops WPT. MPAN-N while on WPT enters activation state when scheduled power transfer times out. For best certainty, response period is put to end for the superframe. Power transfer will begin again from the next superframe when MPAN-C request for PTBRq.

10.3 Invigoration

If MPAN-N becomes low in power, MPAN-N may request power transfer from MPAN-C even though it was not on the first priority. The MPAN-N low in battery can receive a small portion of power, off from what was originally being transferred to MPAN-N on the schedule.

When spontaneous period begins, MPAN-C sends PTPC to let MPAN-Ns low in power request for power transfer with PTRC. Receiving PTRC, MPAN-C will send PTEC (with ack.) to MPAN-N to transfer power in spontaneous period. If MPAN-N in low power properly reply PTECA to MPAN-C, then MPAN-C starts power transfer. The process will be repeated until MPAN-N enters stabilization. Whilst, MPAN-Ns in stabilization isolate themselves upon receiving PTEC, so that power transfer in spontaneous period will be for low invigoration and revitalization.

10.4 Revitalization

If the power of MPAN-N is completely dry out and powered off, the MPAN-N is able to receive WPT regardless of the control from MPAN-C. Once enough power has been supplied and MPAN-N is automatically turned on, the MPAN-N enters low-power hibernation state directly; the following step is identical to the procedures of invigoration.

However, in order to effectively manage revitalization process, MPAN-C regularly sends PTEC (no ack.) and power along with PLRC in spontaneous period. Power-down node may not reply to PLRC, but just turned on low-power MPAN-N can promptly reply PLRCA to MPAN-C as soon as MPAN-N is revived from the power and receive PLRC after every short power transfer interval. As soon as MPAN-C is informed of low power MPAN-N the process carries on as invigoration.

11 Air Interface
11.1 Frequency

MPAN's center frequency ($f_c$) is between 80 kHz and 400 kHz; it could be 88 kHz, 128 kHz, and 370 kHz with a maximum tolerance of ±20 ppm.

11.2 Signal Waveform for WPT

Figure 35:
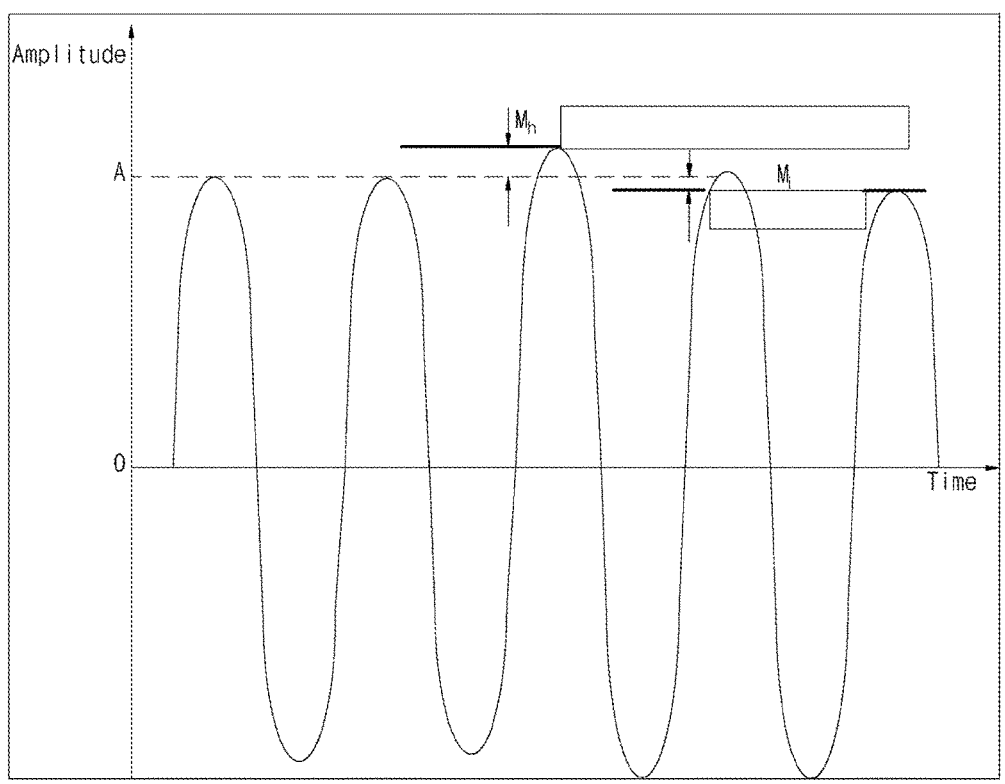
FIG. 35 is a diagram illustrating WPT signal.

FIG. 35 shows the waveform for WPT, and the envelope parameters are defined in Table 10. A general sine waveform is used for WPT because it provides high power transfer efficiency. Amplitude in Table 10 denotes the amplitude of the envelope. The envelope amplitude is varied from negative variation $M_l$ to positive variation $M_h$ within 10% of Amplitude.

TABLE 10

| WPT envelope parameters | | | |
|---|---|---|---|
| Parameter | Symbol | Min. | Max. |
| Positive variation | $M_h$ | 0 | 0.1 Amplitude |
| Negative variation | $M_l$ | 0 | 0.1 Amplitude |

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method performed by a wireless charging device for receiving wireless power from a power transmission apparatus, the method comprising:
   entering a hibernation power level detection state as the wireless charging device is turned on;
   detecting a power level of the wireless charging device in the hibernation power detection state; and
   entering one hibernation state from among a power down hibernation state, a low power hibernation state, and a stable hibernation state, according to the detected power level,
   starting to receive the wireless power in response to the one hibernation state being the power down hibernation state, and detecting different types of wake-up signals based on whether the one hibernation is the low power hibernation state or the stable hibernation state.

2. The method of claim 1, wherein the entering into a power down hibernation state, a low power hibernation state and a stable hibernation state according to the detected power level comprises:
   entering the power down hibernation state when the detected power level is lower than a first threshold level;
   entering the low power hibernation state when the detected power level is higher than the first threshold level and lower than a second threshold level; and
   entering the stable hibernation state when the detected power level is higher than the second threshold level.

3. The method of claim 2, further comprising:
   entering a general activation state when wake-up 1 signal is detected while in the stable hibernation state.

4. The method of claim 2, further comprising:
   entering a power status feedback state when wake-up 3 signal is detected while in the stable hibernation state.

5. The method of claim 2, further comprising:
   entering a low power packet analysis state when wake-up 2 signal is detected while in the low power hibernation state.

6. The method of claim 5, further comprising:
   entering a low power packet generation state when receiving a power transfer permission command while in the low power packet analysis state; and
   generating a power transfer request command to request for power transfer.

* * * * *